United States Patent

Mistrater et al.

[11] Patent Number: 5,328,181
[45] Date of Patent: Jul. 12, 1994

[54] LOW ENERGY TRANSFER MANDREL AND PROCESS FOR USING MANDREL

[75] Inventors: Alan B. Mistrater; Stanley J. Pietrzykowski; Alfred O. Klein, all of Rochester; Loren E. Hendrix, Webster; Mark Petropoulos, Ontario; Paul L. Jacobs, Webster; Gary A. Batt, Fairport; Eugene A. Swain, Webster; Alexander A. Antonelli, Rochester, all of N.Y.

[73] Assignee: Xerox Corporation, Stamford, Conn.

[21] Appl. No.: 996,227

[22] Filed: Dec. 23, 1992

[51] Int. Cl.⁵ ............................................. B23B 31/40
[52] U.S. Cl. ............................... 279/2.17; 198/803.7; 269/48.1; 294/93
[58] Field of Search ................... 279/2.01, 2.1–2.12, 279/2.17, 2.22; 269/48.1; 242/68.2, 72 R; 294/93; 414/910; 198/803.7–803.9, 803.12; 118/500

[56] References Cited

U.S. PATENT DOCUMENTS

| 574,763 | 1/1897 | Rudolph | 279/2.17 X |
| 3,777,875 | 12/1973 | Sobran | 198/131 |
| 3,945,486 | 3/1976 | Cooper | 198/179 |
| 4,050,731 | 9/1977 | Coone et al. | 294/93 X |
| 4,680,246 | 7/1987 | Aoki et al. | 430/133 |

FOREIGN PATENT DOCUMENTS

| 0217778 | 1/1985 | Denmark | 294/93 |
| 1156896 | 5/1958 | France | 279/2.17 |

Primary Examiner—Steven C. Bishop

[57] ABSTRACT

A mandrel for transporting hollow cylinders including an elongated arm having a first end and a second end, an expandable disk supported at the first end and means supported at the second end to expand the expandable disk, the mandrel arm comprising an elongated body having an imaginary axis and at least three fins extending substantially radially from the arm, each of the fins having an alignment shoulder adjacent the first end adapted to receive an end of a hollow cylinder and to coaxially align the cylinder with the elongated arm. This mandrel is used in a process for coating hollow cylinders.

13 Claims, 3 Drawing Sheets

LOW ENERGY TRANSFER MANDREL AND PROCESS FOR USING MANDREL

BACKGROUND OF THE INVENTION

This invention relates in general to an improved mandrel for transporting hollow cylinders and, more specifically, to a mandrel and process for using the mandrel for coating hollow cylinders.

Although this invention is especially useful for the fabrication of electrostatographic imaging members, it is not limited to such application. Electrostatographic imaging members are will known in the art and include electrophotographic imaging members and electrographic imaging members.

Electrophotographic imaging member may be in the shape of a hollow drum or cylinder and are coated with at least one active electrophotographic imaging layer. The active electrophotographic imaging layer may comprise a single photoconductive layer or comprise a plurality of active electrophotographic layers such as a charge generating layer and a charge transport layer. These drum shaped electrophotographic imaging members embodiments are well known in the art.

Electrostatographic drums are conventionally coated by immersing hollow cylinders into a liquid coating solution, withdrawing the cylinders coated with the coating solution and drying the coating on the cylinders. Generally, the coating applied to the cylinder is confined to the exterior surface of the cylinder to conserve coating material, to avoid heat build-up, and to provide an internal contact surface for electrical contact for electrical grounding or biasing. To prevent any significant deposition of coating material onto the interior of the cylinder during immersion of the substrate into the coating bath, the cylinder axis is maintained in a vertical position or attitude and air within the hollow cylinder is trapped in at least the lower section of the interior of the cylinder by various known techniques. Trapping of the air in the cylinder while the cylinder axis is maintained in a vertical attitude minimizes wasteful deposition of coating material within the interior of the cylinder. One technique for trapping air within the cylinder is to insert the lower end of a mandrel into the upper open end of a cylinder, the mandrel having an expandable component positioned at or adjacent to its lower end which can be expanded to firmly contact and grip the interior of the cylinder to form a seal which traps air in the section of the cylinder below the seal during immersion of the cylinder in a coating liquid. One such technique is described in U.S. Pat. No. 4,680,246, the entire disclosure thereof being incorporated herein by reference. In another embodiment, the expandable mandrel component has a shape similar to that of a disk or thick washer. The outside diameter of this expandable disk shaped member, in its normal unstressed state, is slightly less than the interior diameter of the cylinder that is transported by the mandrel. The axis of this disk is coaxial with the main mandrel body. The expandable disk is expanded by applying compressive pressure on at least a segment of the upper and lower surfaces of the disk. The applied compression pressure causes the length of the circumference of the circular outermost edge of the disk to increase sufficiently whereby the outer periphery of the disk firmly contacts and grips the interior surface of the cylinder so that the mandrel can support and carry the cylinder from one location to another and also function as an air seal to trap air within the interior of the cylinder in the section below the cylinder when the cylinder is immersed in a liquid coating bath. The compressive pressure may be applied to the disk by applying a pulling or tension force on a tension shaft extending from a presser means through the center of the disk and through the mandrel body whereby the disk is squeezed by the presser means against the adjacent lower end of the mandrel body. The use of a mandrel that supports a hollow cylinder by gripping only the interior of the cylinder facilitates coating of the exterior surface of the cylinder without any mechanical object contacting either the exterior surface of the cylinder or the coating deposited on the exterior surface. The mandrel is supported at its upper end by any suitable conventional conveyor means. The conveyor means can comprise means to raise and lower the mandrel and/or the entire conveyor means may be raised and lowered by any suitable and conventional means such as an elevator means.

Generally, in fabricating electrophotographic imaging members, the cylindrical substrate is transported to a cleaning station where it is cleaned. After cleaning, the substrate is transported to a coating station where a coating is applied. After application of the coating, the coated substrate is transported to a drying station maintained at an elevated temperature to dry off the solvent used during application of the coating. Upon completion of the drying steps, the photoreceptor is subsequently transported one additional time to another coating station and drying station. One conventional technique for coating cylindrical substrates is by dipping the cylinder into a bath of liquid coating material. Upon removal of the substrate from the coating bath, it is transported to a heating oven which can be, for example, a forced air oven. The common technique for coating the coated cylinder into the drying zone is to place the freshly coated cylinders onto a platen. The platen is normally transported on a conveyor through the drying zone.

During the dip coating operation, the cylindrical substrate is supported from above by a mandrel arm which extends into the interior of the cylindrical substrate and expands and grips the inner walls of cylindrical substrate. The upper hand of the mandrel is secured to a conventional conveyor system which raises and lowers the mandrel for purposes of dipping the cylinder into a coating bath and thereafter withdrawing the cylinder. The various steps of loading cylinders onto a mandrel, unloading them onto a platen, loading them back up onto another mandrel for another coating step and unloading onto another platen for a drying step clearly increases the number separate loading and unloading steps which in turn increases the likelihood that the substrate or coating thereon be damaged during the multiple handling steps. However, when attempts are made to maintain the cylindrical substrate on the same mandrel through a coating, drying, second coating, second drying, etc. steps, difficulties have been encountered with the formation of uneven coatings and/or coatings with electrical properties which are non-uniform from one end of the coated drum to the other end. These uneven properties profiles along the length of the coated cylinder render the coated cylinder unsuitable for high quality imaging systems.

It has been found that a portion of the cylindrical substrate above the expanded gripping disk of the mandrel took longer to warm up during the drying operation than the portion of the cylindrical substrate below the gripping disk. Also, the portion of the cylindrical substrate above the gripping disk of the mandrel tended to cool more slowly after removal from the hot drying zone. The mandrel formed a heat sink that absorbed heat that retarded heating of the upper region of the cylinder during the heat drying step and radiated heat that retarded cooling of the upper section of a coated hollow cylinder relative to the effects occuring in the lower section of a coated hollow cylinder during heating and cooling. Also, cold air tramped in the interior upper section of the coated cylinder also retarded heating of the upper section of the hollow cylinder compared to the lower section of the coated hollow cylinder. Further, after the drying treatment, hot air tramped in the upper section of the coated hollow cylinder tended to retard cooling relative to the cooling rate of the lower section of the coated substrate. Also, heat energy conduction through the expansion disk from the interior surface of the cylindrical substrate to the mandrel also retarded heating of the cylinder during the drying operation and heat energy conduction through the expansion disk from the the mandrel to the interior surface of the cylindrical substrate retarded cooling during the cooling operation following the drying step. Further, heat energy radiated from the interior surface of the cylindrical substrate to the mandrel also retarded heating of the cylinder during the drying operation and heat energy radiation from the the mandrel to the interior surface of the cylindrical substrate retarded cooling during the cooling operation following the drying step.

INFORMATION DISCLOSURE STATEMENT

U.S. Pat. No. 4,680,246 to Aoki et al, issued Jul. 14, 1987—A method is disclosed for holding a hollow cylindrical body without a bottom without contacting the outside surface thereof and immersing the body in a liquid with which the outside surface of the cylindrical body is to be coated and preventing the liquid from contacting the inside wall of the cylindrical body. The method utilizes a device which includes an inflatable elastic membrane which tightly contacts the inside wall of the cylindrical body and holds the body when it is inflated by supply of compressed fluid. A process for producing an electrophotographic element is also disclosed including the steps of holding the hollow cylindrical body without a bottom, immersing the cylindrical body in a liquid containing a photosensitive material and separating the cylindrical body from the liquid to form a uniform photosensitive layer only on the outside surface thereof.

U.S. Pat. No. 3,945,486 to Cooper, issued Mar. 23, 1976—Apparatus is disclosed for releasably supporting and transporting rigid open-mouthed containers by engaging the interior surface of the container mouth with an inflatable 'elongated elastomeric diaphragm, means being provided for inflating and deflating the diaphragm. The apparatus is particularly useful in suspending and conveying heated glass bottles through various processing stages wherein various coatings are applied to the outer surfaces of the bottles. The elastomeric diaphragm may be molded from a silicone rubber elastomer.

U.S. Pat. No. 3,777,875 to Sobran, issued Dec. 11, 1973—A hanger or support apparatus is disclosed for suspending a container by engagement with the interior wall of the opening portion of the container. Means are provided for quickly engaging and disengaging the hanger. The hanger is particularly adapted for suspending heated glass bottles for conveyance through an electrostatic coating apparatus.

In copending application entitled "MANDREL WITH EXPANDABLE HIGH TEMPERATURE ELASTOMERIC POLYMER DISK AND PROCESS FOR USING MANDREL", Ser. No. 07/996,430, filed Dec. 23, 1992, a mandrel is disclosed comprising a mandrel for transporting a hollow cylinder comprising an elongated arm having an imaginary axis, an expandable disk shaped member having at least one hole and a circular outermost edge, the disk shaped member being mounted on and coaxially aligned with one end of the arm and comprising an elastomeric polymer material having a durometer of between about 25 and about 35 and a maximum continuous use temperature rating of at least about 230° C., and means mounted on the mandrel to apply compressive pressure to the disk shaped member to increase the length of the circumference of the circular outermost edge. This mandrel is used in a process for coating hollow cylinders. The entire disclosure of this application is incorporated herein by reference.

In copending application entitled "SELF ADJUSTING MANDREL WITH EXPANDABLE ELASTOMERIC DISK AND PROCESS FOR USING MANDREL", Ser. No. 07/995,489, filed Dec. 23, 1992, a mandrel is disclosed comprising an elongated arm having a first end and a second end, a reciprocatable shaft coaxially aligned with and extending through the arm, a first end of the shaft extending beyond the first end of the arm and a second end of the shaft extending beyond the second end of the arm, a presser means mounted at the first end of the shaft, an expandable disk shaped member coaxially aligned with and slidably mounted on the shaft between the presser means and the first end of the arm, a compression means mounted on the second end of the shaft, and a resilient helical spring coaxially aligned with and slidably mounted on the shaft between the presser means and the compression means, the compression means adopted to apply compression pressure to the disk shaped member and to the helical spring. The entire disclosure of this application is incorporated herein by reference.

In copending application entitled "MANDREL WITH FLARED, DISH SHAPED DISK AND PROCESS FOR USING MANDREL", Ser. No. 07/996,431, filed Dec. 23, 1992, a mandrel is disclosed comprising a mandrel for transporting a hollow cylinder comprising an elongated arm, a dish shaped disk adjacent one end of the elongated arm, the dish shaped disk having a flexible lip flared inclined away from the elongated arm, the flared flexible lip having a circular outermost edge, and a reciprocable presser means adapted to partially flatten at least a portion of the flexible lip adjacent to and including the outermost edge of the lip toward the elongated arm to increase the length of the circumference of the circular outermost edge of the lip. This mandrel is used in a process for coating hollow cylinders. The entire disclosure of this application is incorporated herein by reference.

In copending application entitled "Dip Coating Process Material Handling System", Ser. No. 07/995,491, filed Dec. 23, 1992, a dip coating system for applying and drying coatings is disclosed that is capable of using the mandrel of this invention. The entire disclosure of this application is incorporated herein by reference.

SUMMARY OF THE INVENTION

It is, therefore, an object of the present invention to provide an improved mandrel and process of using the mandrel which overcomes the above-noted deficiencies.

Another object of this invention is provide a mandrel which minimizes trapping of hot air or cold air within the interior of a cylindrical substrate above the expansion ring.

Yet another object of this invention is provide a mandrel which absorbs less heat energy during the drying of a cylindrical substrate.

Still another object of this invention is provide a mandrel which radiates less heat energy during the cooling of the coated cylindrical substrate.

Another object of this invention is provide a mandrel which reduces conduction between the expandable disk and the rest of the mandrel.

Yet another object of the present invention to provide an improved mandrel which resists deterioration when subjected to high temperatures.

Still another object of the present invention to provide an improved mandrel which withstands cyclic temperature excursions.

Another object of the present invention to provide an improved mandrel which is resistant to chemical fumes.

Yet another object of the present invention to provide an improved mandrel having and expandable component that retains plastic memory when repeatedly subjected to simultaneous heating and compressing.

The foregoing objects and others are accomplished in accordance with this invention by providing a mandrel for transporting hollow cylinders comprising an elongated arm having a first end and a second end, an expandable disk supported at the first end and means supported at the second end to expand the expandable disk, the mandrel arm comprising an elongated body having an imaginary axis and at least three fins extending substantially radially from the arm, each of the fins having an alignment shoulder adjacent the first end adapted to receive an end of a hollow cylinder and to coaxially align the cylinder with the elongated arm. This mandrel is used in a process for coating hollow cylinders.

BRIEF DESCRIPTION OF THE DRAWINGS

A more complete understanding of the process of the present invention can be obtained by reference to the accompanying drawings wherein.

The figures are merely schematic illustrations of the prior art and the present invention. They are not intended to indicate the relative size and dimensions of mandrels or components thereof.

DETAILED DESCRIPTION OF THE DRAWINGS

Figure 1:
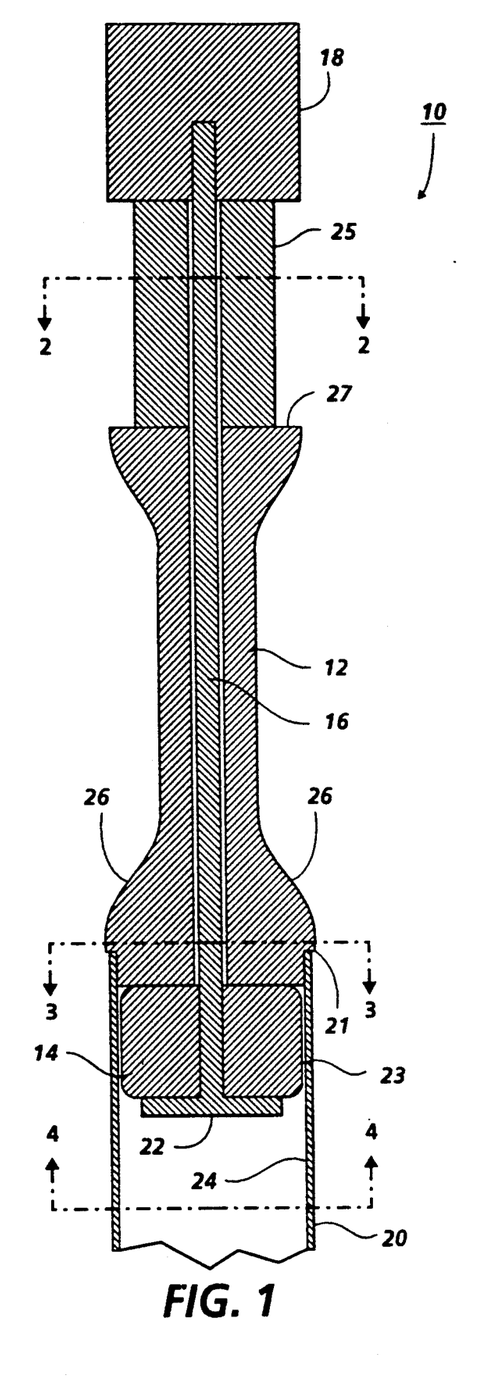
FIG. 1 is a schematic illustration of a sectional view in elevation of a mandrel of this invention.

Referring to FIG. 1, a mandrel 10 is shown comprising an elongated arm 12, an expandable disk shaped member 14, a tension shaft 16, tension applying means 18 attached to the upper end of tension shaft 16 and mounted and supported by the upper end of elongated arm 12, and hollow cylinder 20. The upper edge of hollow cylinder 20 is seated against alignment shoulder 21 to ensure that hollow cylinder 20 is coaxially with the axis of mandrel 10. Secured to the lower end of tension shaft 16 is a presser means 22. Tension applying means 18 may comprise any suitable means capable of pulling tension shaft 16, tension upwardly. Typical tension applying means include, for example helical springs, solenoids, two way acting air cylinders, screws, levers, notched ramps, cam devices, and the like. When tension applying means 18 is activated by any suitable technique such as supplying electricity to or terminating the supplying of electricity to a solenoid, it pulls tension shaft 16 upwardly. Upward movement of tension shaft 16 causes a corresponding upward movement of presser means 22 which compresses expandable disk shaped member 14 against the bottom end of elongated arm 12. Application of compression pressure on at least a sufficient area of the top and bottom surfaces of expandable disk shaped member 14 causes the circular outermost edge 23 to increase in circumference whereby it contacts, frictionally grips and forms an air tight seal with the interior surface 24 of hollow cylinder 20. Expandable disk shaped member 14 is illustrated in FIG. 1 in a relaxed condition prior to application of compressive pressure. Thus, the circular outermost edge 23 has a flat profile and is shown out of contact with the interior surface 24 of hollow cylinder 20. Constricted section 25 of elongated arm 12 may be inserted into a yoke or hole of any suitable conveyor means (not shown) prior to mounting of tension applying means 18 to secure mandrel 10 to the conveyor means. Alignment shoulder 21 comprises a notch at or near the lower outermost corner of each fin 26.

Figure 2:
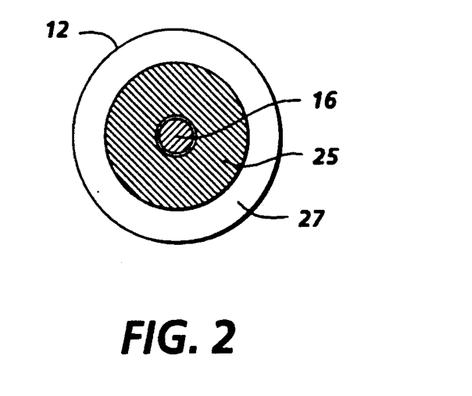
FIG. 2 is a schematic illustration of a cross sectional view of the upper segment of the mandrel shown in FIG. 1 taken along line 2—2.

In FIG. 2 the upper segment of the mandrel shown in FIG. 1 is viewed in direction along lines 2—2 and illustrate upper shoulder 27 of elongated arm 12 and tension shaft 16. Upper shoulder 27 serves as a stop for the conveyor means described above.

Figure 3:
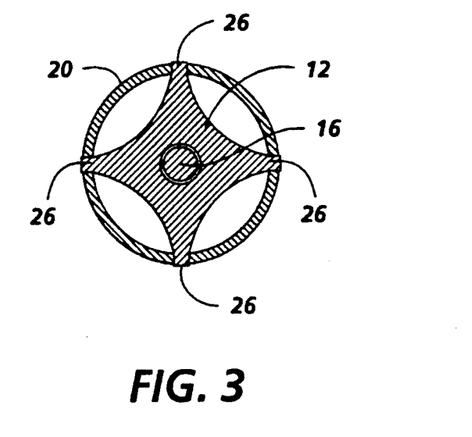
FIG. 3 is a schematic illustration of a cross sectional view of the upper segment of the mandrel shown in FIG. 1 taken along line 3—3.

Depicted in FIG. 3 is a cross sectional view in the direction of 3—3 showing each fin 26, the upper edge of hollow cylinder 20, and tension shaft 16.

Figure 4:
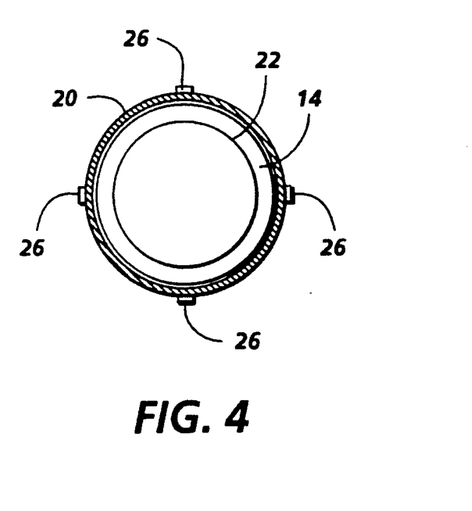
FIG. 4 is a schematic illustration of a view of the bottom of the mandrel shown in FIG. 1.

Shown in FIG. 4 is a view of the bottom of mandrel 10 viewed in direction along lines 4—4 illustrating each fin 26, hollow cylinder 20, and presser means 22.

Figure 5:
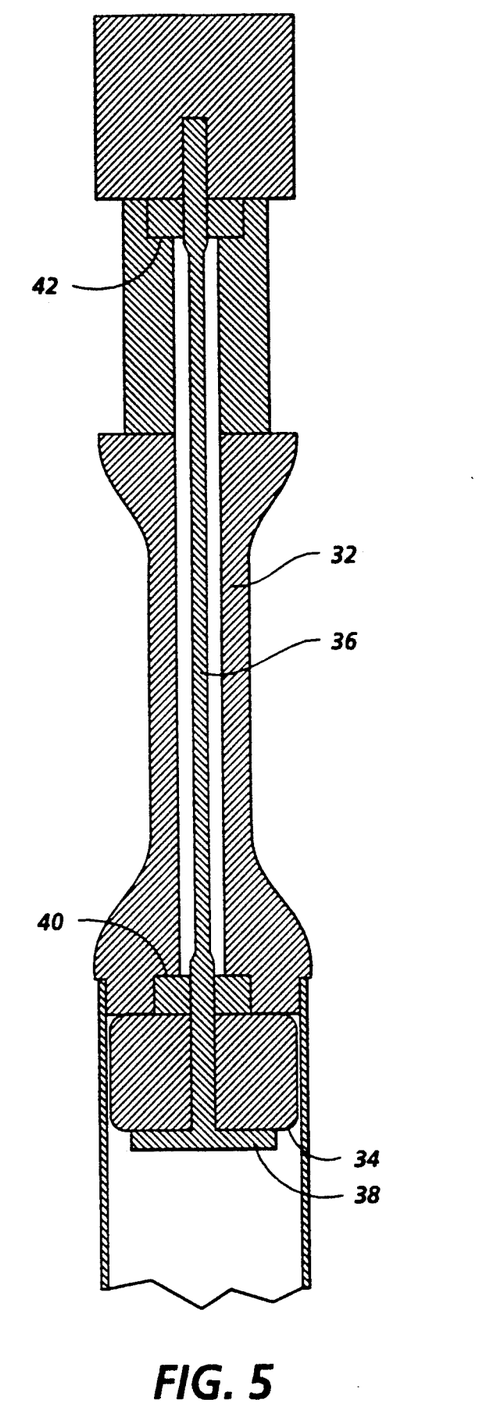
FIG. 5 is a schematic illustration of a sectional view in elevation of another embodiment of a mandrel of this invention.

Referring to FIG. 5, a mandrel 30 is shown comprising an elongated arm 32, an expandable disk shaped member 34, a tension shaft 36 having at its lower end a presser means 38. If desired, presser means 38 may be removably secured to tension shaft 36 by any suitable technique such as threaded hole in the center of presser means 38 which accepts a threaded end on tension shaft 36 (not shown) to facilitate replacement of expandable disk shaped member 34. Expandable disk shaped member 34 is expanded and contracted in the manner described above with reference to FIG. 1 and hereinafter.

If desired, expandable disk shaped member 34 may be replaced by an inflatable bladder similar to the one illustrated in FIG. 3 of U.S. Pat. No. 4,680,246, the entire disclosure thereof being incorporated herein by reference. Unlike tension shaft 16 illustrated in FIG. 1, tension shaft 36 is reduced in thickness to reduce its mass. This reduction in mass also reduces its capability to function as a heat seak or heat radiation source. In addition, thermally insulating bearing inserts 40 and 42 are provided to reduce thermal conduction between tension shaft 36 and elongated arm 32.

Figure 6:
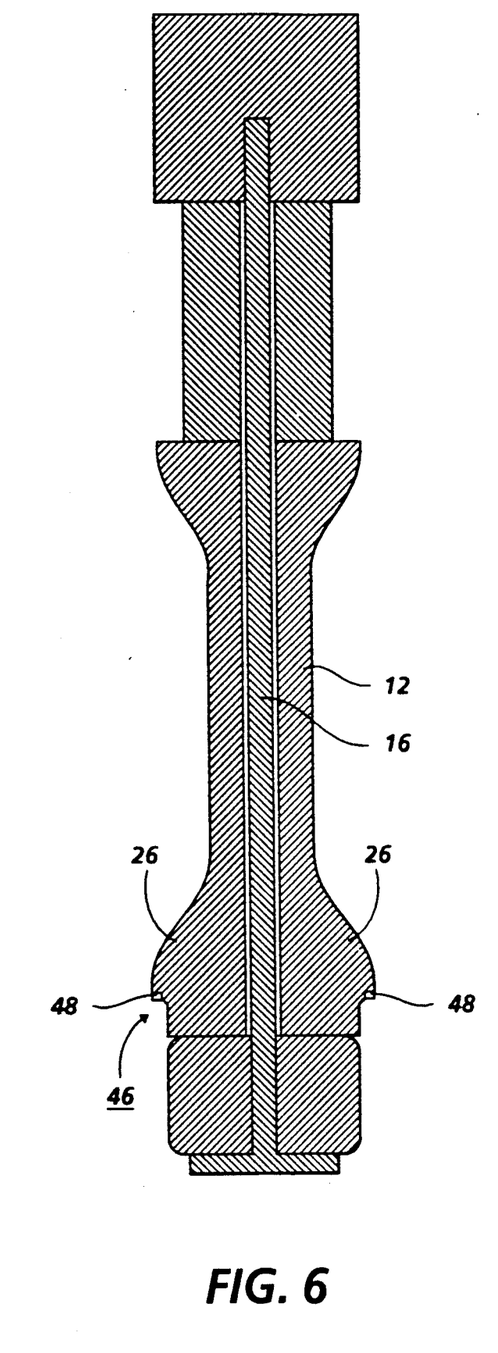
FIG. 6 is a schematic illustration of a sectional view in elevation of another embodiment of a mandrel of this invention.

In FIG. 6 another embodiment of a mandrel of this invention is illustrated. This mandrel is similar to the mandrel shown in FIG. 1 except that alignment shoulder 46 includes a thermally insulating insert material 48 at the notch located at or near the lower outermost corner of each fin 48. Thermally insulating insert material 48 contacts the upper edge of the hollow cylinder (not shown) and reduces heat transfer between the elongated arm and the hollow cylinder.

Figure 7:
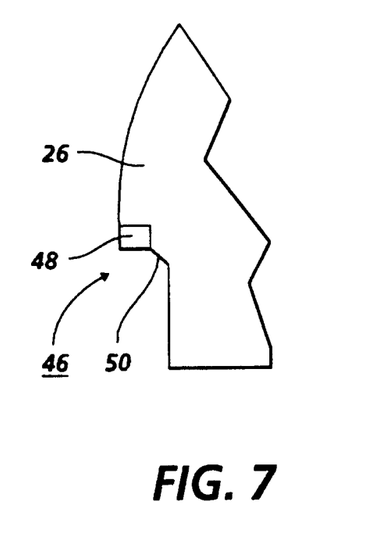
FIG. 7 is an expanded schematic illustration of a segment of part of a fin used in a mandrel of this invention.

Depicted in FIG. 7 is an expanded view of still another embodiment of fin on a mandrel of this invention. The mandrel is similar to the mandrel shown in FIG. 6 except that alignment shoulder 46 includes, in addition to thermally insulating insert material 48, a chamferred edge 50 on each fin to guide and center the hollow cylinder (not shown).

The expression "disk shaped member" is intended to include any suitable shape generally resembling a disk or thick washer having at least one circular outermost edge. The disk shaped member may also contain at least one hole to accommodate reciprocal movement of at least one tension shaft. The hole or holes in the disk shaped member may be of any suitable shape. Typically, the hole is circular to avoid concentration of stress during compression. Generally, the length of the diameter or diameters of the disk hole or holes, respectively, is less than about 70 percent of the length of the outside diameter of the disk (i.e. diameter of the circular outermost edge) to minimize memory fatigue during cycling and to ensure that sufficient elastomeric material is present to for adequate expansion when the disk is compressed. A single central hole is preferred for reasons of simplicity and maximization of disk durability. A typical shape for the expandable disk is similar to that of a donut. Also, other than the hole or holes to accommodate at least one tension shaft, the disk may be completely solid or contain one or more hollow chambers. Alternatively, the edge of the expandable disk shaped member may be formed into a bellows configuration where a cross-sectional view of the outer periphery of the disk resembles the sides of a bellows. The outermost periphery of each segment of the bellows that ultimately contacts the interior surface of the hollow cylinder when the bellow shaped disk is compressed are substantially circular to ensure uniform contact between the disks and the interior surface of the hollow cylinder to achieve an adequate seal for trapping air or other ambient fluid within the cylinder beneath the disk when the cylinder is immersed in a coating liquid bath.

The minimum size of the disk can vary considerably depending upon the means utilized to apply compression force to squeeze the disk whereby the outside diameter of the disk expands sufficiently to contact and frictionally grip the interior surface of the cylinder.

Satisfactory results may be achieved with elastomeric polymer material for the expandable disk shaped member having a durometer between about 20 and about 40.

Any suitable high temperature resistant elastomeric polymer having the aforesaid durometer and maximum continuous use temperature characteristics may be utilized. The disk elastomeric polymer should also should be inert and resistant to the solvents utilized in the coating mixtures. Typical elastomers having a durometer of between about 25 and about 35 and a maximum continuous use temperature rating of at least about 230° C. include, for example, elastomeric fluorocarbon rubbers, silicone rubbers, fluorosilicone rubbers, ethylene propylene rubber, and the like. Optimum results are achieved with fluoroelastomeric copolymers of vinylidene fluoride and hexafluoropropylene. Fluoroelastomeric copolymers of this type are available under the trademark Viton, available from E. I. duPont de Nemours & Company. Another example of a preferred polymer is a terpolymer elastomer of ethylene-propylenediene monomer, an elastomer based on stereospecific linear terpolymers of ethylene, propylene and small amounts of a nonconjugated diene such as a cyclic or aliphatic diene (hexadiene, dicyclopentadiene, or ethylidene norbornene), the unsaturated part of the terpolymer molecule is pendent from the main chain which is completely saturated.

Although metals are deformable under sufficient applied pressure, they are thermally conductive and form a heat sink at the point of contact with the interior surface of the cylinder thereby cooling the cylinder at the contact point which in turn causes deformation of the coating during drying at elevated temperatures. Also, the force required to compress metal would collapse most ordinary mandrel arms during the disk compression step. Thus, the expandable disk shaped member should comprise an elastomeric polymer material having a durometer of between about 25 and about 35.

Typically, the average radial distance between the outermost surface of the expandable disk shaped member and the interior surface of the cylinder prior to disk expansion is about 250 micrometers (0.01 inch). This spacing allows the disk to be readily introduced into the interior of the cylinder prior to expansion of the disk and allows the cylinder to fall away by gravity from the disk after the outer circumference of the disk is contracted. Preferably, the maximum average radial distance between the outermost surface of the disk and the inner surface of the cylinder prior to disk expansion is about 500 micrometers (0.020 inch). Distances greater than about 500 micrometers tend to increase the radius of the disk during cycling. The average radial distance between the outermost surface of the disk and the inner surface of the cylinder prior to disk expansion should at least be sufficient to permit the disk to be easily slid into the interior of the hollow cylinder.

Any suitable means may be utilized to compress the expandable disk shaped member. Generally, expansion of the disk shaped member is achieved by compressing the disk between the mandrel and the presser means. The presser means is activated or inactivated by means of a reciprocatable tension shaft. One end of the presser shaft is secured to the presser means and the other end of the shaft extends through the elongated arm of the mandrel to a means for moving the shaft in an axial direction toward the presser means or away from the presser means. Movement of the shaft toward the presser means removes the compression force applied to the expandable disk shaped member whereas movement of the shaft in a direction away from the compressor means causes the presser means to compress the disk against the lower end of the mandrel arm. Any suitable means may be utilized to apply tension to the tension shaft. A tension supplying means may simply be, for example, a nut threaded onto the tension shaft. Activation of the tension supplying means by screwing the nut onto the tension shaft in the direction of the mandrel body places the tension shaft under tension which in turn pulls the presser means toward the disk and compresses the disk against one end of the mandrel body. Other typical tension supplying means include solenoids, two way acting air pistons, hydraulic pistons, coil springs, air cylinders, latching cams, screws, levers, notched ramps, cam devices, and the like. Means for reciprocating the shaft in one direction or another include any suitable device such as a cam, solenoid, two-way acting air piston, motor driven crank shaft in which the reciprocal shaft functions as a connecting rod, screws, levers, notched ramps, cam devices, and the like. Generally, compression pressure is applied to at least a portion of the top and bottom of the expandable disk shaped member. The presser means may have any suitable shape that will apply sufficient pressure to the bottom of the disk to increase the length of the circumference of the circular outermost edge and to effectively seal the hole in the disk. Preferably, the surface of the presser means facing the disk has a contour that generally conforms to the contour of the bottom surface of the disk.

When compressed sufficiently to force the circular outermost edge of the disk into frictional contact with the interior surface of the hollow cylinder, the disk must function as both an air seal and a substrate holding device. Generally, the amount of applied compression force affects the cycling life of the disk. Preferably, the compression force utilized to adequately expand the outer periphery of the disk should be less than about 65 percent of the maximum memory force rating of the elastomeric material being utilized. Typical maximum memory force ratings for typical elastomeric material having a durometer of between about 25 and about 35 and having a maximum continuous use temperature of at least about 230° C. include, for example, 40 psi for silicone; 60–120 psi for flourosilocones; 70–150 psi for flourocarbons; and the like.

Generally, compression pressure applied to a disk is adjusted at room temperature to a predetermined cylinder pull off force. For example, a pull off force of about 15 pounds for pulling a hollow cylinder off of a mandrel having an expanded disk at room temperature is satisfactory for transporting a hollow cylinder weighing about 80 to about 120 grams. Obviously the pull off force varies with the weight of the hollow cylinders to be transported. Typically, a pull off force at room temperature can range from about 1 pound to about 30 pounds depending on the actual weight selected for most conventional aluminum cylinders. A pull off force greater than about 30 pounds is usually undesirable because the gripping force causes elastomer memory degradation and increases the heat sink characteristics of the expandable donut.

The fins may be of any suitable shape. Preferably, the fins are as thin as possible while still retaining sufficient strength to support the hollow cylinder. The fins may be of uniform thickness or of varying thickness. Preferably, for greater strength, the fins are thicker in the region where they join the main body of the elongated arm. The fins may be integral with main body of the mandrel or separate sections that are attached to the mandrel by suitable techniques such as welding, gluing or the like.

The fins should provide ample openings between the ambient atmosphere and the upper end of the hollow cylinder after installation of the mandrel in the cylinder. These large openings facilitate circulation of air into and out of the upper end of the hollow cylinder during transport of the mandrel and cylinder from one temperature zone to another thereby rapidly equalizing temperatures in the cylinder above and below the expanded disk. It is preferred that at least about 50 percent of the internal cross-sectional area of the open end of the top of the cylinder remains open for air circulation after the mandrel has been inserted and with the fin alignment shoulders in contact with the top edge of the drum for coaxial alignment of the cylinder with the axis of the elongated arm. However, satisfactory results may be achieved when at least about 25 percent of the internal cross-sectional area of the open end of the top of the cylinder remains open after the mandrel has been inserted into the drum. As previously indicated, coating irregularities occur when the top of the hollow cylinder remains hot while the rest of the hollow cylinder cools down or stays cool while the rest of the substrate becomes hot. Also, a retarded heating rate for the upper portion of the coating hollow cylinder requires a longer heating period to adequately dry the deposited coating.

The mandrel should also have at least three fins substantially equally spaced from each other around the axis of the mandrel and extending substantially radially from said body. Four fins are preferred for greatest stability in supporting and registering of the end of a hollow cylinder. Although as many as five or six fins may be utilized, further increase in the number of fins tend to increase the total mass of the mandrel, inhibit air circulation into and out of the upper end of the hollow cylinder, and increase the conduction surface contact area between the fins and the hollow cylinder, all of which increase the likelihood for undesirable deformation and changes in the electrical characteristics of the active electrophotographic layers on the hollow cylinder to occur. A uniform temperature profile in the hollow cylinder during heating and cooling is vital to achieving high quality coatings which meet precise electrical and physical tolerances. When holes are utilized in the mandrel arm instead of fins, it has been found that the holes cause more stress on the mandrel structure and do not provide for adequate air flow into and out of the upper section of the hollow cylinder.

The length of the fins measured in a direction parallel to the axis of the mandrel arm depends upon the material utilized and the thickness of the fins. However, the length of the fins should be sufficient to prevent noticeable distortion of the original shape when subjected to disk compression pressures and when exposed to the various temperature zones through which it travels. Also, the lower end of the fins should be adjacent to, contact and support the upper end of the hollow cylinder during transport of the hollow cylinder. Further, the fins should extend sufficiently in radial direction from the axis of the mandrel arm to provide an angular alignment shoulder that contacts the upper end of the hollow cylinder and aligns it co-axially with the axis of the mandrel arm. This alignment ensures that the axis of the hollow cylinder is in a vertical attitude when immersed in the coating liquid. Vertical immersion of the cylinder into and withdrawal from the coating bath is important for trapping of air in interior the region of the drum below the expanded disk, for uniform deposition of coating material and to obtain an uncoated band of predetermined width at the top of the cylinder. To further assist in the alignment of the axis of the cylinder co-axially with the axis of the elongated mandrel arm during insertion of the mandrel into the cylinder, the fins may also be chamfered or tapered below the alignment shoulder with the chamfered surface angled from the alignment shoulder toward the axis of the elongated arm. The chamfered surfaces are used to positively guide, seat, align and center any cylinder which is not initially perfectly positioned on a supporting platen during insertion of the mandrel. Thus, the chamfered surfaces ensure that the top edge of the hollow cylinder contacts each of the alignment shoulder surfaces on each of the fins to precisely center the cylinder with respect to the axis of the elongated arm.

In order to further reduce heat conduction between the fins and the hollow cylinder, it is preferred that heat insulating inserts be mounted in the fins to form the alignment shoulder surface, particularly if the fins comprise highly heat conductive material. To further reduce heat transfer between the mandrel body and the tension shaft, insulating bushings may be mounted in the mandrel body to support the tension shaft. In addition, the mass of the tension rod and mandrel arm may be reduced to minimize heat sink characteristics. All of these features reduce or prevent temperature profile distortions in the cylinder and coatings.

Preferably, the mandrel arm preferably comprises a film forming polymer having an ASTM maximum continuous use temperature rating of at least about 232° C. to retain its shape and to avoid chemical and physical degradation during repeated compression and high temperature cycling while coating a plurality of hollow cylinders. The expression "maximum continuous use temperature rating" as employed herein is defined as the maximum temperature at which the elastomer can maintain substantially all of its original shape prior to heating and remain chemically stable. Preferably, the material in the elongated arm, including the fins, should also have a coefficient of expansion of between about $0.72 \times (0.00010/\text{degree K.})$ and about $7.5 \times (0.00010/\text{degree K.})$. The thermal conductivity of the mandrel material is preferably to be less than about $1.0 \times (W/mK)$. In addition, the decomposition temperature of any of the material in the mandrel should exceed the maximum drying temperature conditions to which the mandrel is exposed. The deformation temperature of the elongated arm is preferably at least about 250° C. The film forming polymer used in the elongated arm should also be resistant to attack by vapor of the solvents utilized for the coating liquids. Typical film forming polymers stable at high temperatures include, for example, polyetherimide, polyamide imide, polyimide, polyphenylene sulfide, polyetherether ketone, polyether sulfone, and the like. The ASTM maximum continuous use temperature information for various film forming polymers and film forming binders are readily available in the literature. For example, Altem, a polyetherimide, available from General Electric, has an ASTM maximum continuous use temperature of about 170° C. Ryton, a polyphenylene sulfide, available from General Electric, has an ASTM maximum continuous use temperature of about 220°. Fortron, a polyphenylene sulfide is available from Hoechst Celanese, has an ASTM maximum continuous use temperature of about 220° C. When glass fiber fillers are utilized to reinforce film forming binder, the presence of the glass fiber reduces the tendency to distort, increases maximum continuous use temperature. For example, a polyphenylene sulfide film forming polymer having a maximum continuous use temperature of about 220° can have its maximum continuous use temperature raised to greater than about 250° C. when filled with about 40 percent by weight glass fibers.

The film forming polymer utilized in the mandrel arm may contain any suitable filler. Typical fillers include glass fibers, carbon, carbon fibers, aramid, and the like. Generally, the film forming polymer may comprise up to about 40 percent by weight filler based on the total weight of filled mixture. Preferably, glass fiber fillers are utilized to impart greater resistance to deformation under compression pressures at elevated temperature. A glass fiber content of between about 35 percent and about 45 percent by weight based on the total weight of the filled mixture is preferred because of its lower coefficient of expansion and generally lower coefficient of thermal conductivity. The amount of filler present in film forming binders for the mandrel body affects the thermal conductivity of the mandrel arm. For example, a mandrel arm containing only polyetherimide has a thermal conductivity of less than about 0.2 (W/mK) whereas the same film forming polymer filled with glass fibers can have a thermal conductivity of, for example, 0.9 (W/mK). Generally, a mandrel arm thermal conductivity of less than about 1 watt/mK is preferred for preventing degradation of coatings deposited on the hollow cylinder.

The mandrel arm may be fabricated by any suitable technique. Typically techniques include molding, grinding, machining, and the like. Since the molecular alignment of the plastic material in a molded plastic mandrel as well as any fiberous fillers are not uniform, the mixture is amorphous in nature and the coefficient of expansion and contraction also are not uniform throughout the mandrel arm. Thus, because the mandrel is under compression and is transported through markedly different temperature zones, a mandrel arm having nonuniform physical properties can deform in a non-uniform manner, e.g. deform into a cork screw configuration. Thus, materials that undergo plastic flow under coating and drying conditions should be avoided. Elongated arms fabricated from thermally conductive metal, e.g. aluminum, are less preferred because of their heat absorption and heat radiation properties. When highly thermally conductive material is employed in the elongated arms, thermal insulators are preferably utilized at points of contact between the elongated arm and the cylinder and between the elongated arm and the tension shaft. Any suitable thermal insulator having stable chemical and physical properties at the drying temperatures encountered and a thermal conductivity of less than about 1 W/mK may be utilized. Typically mandrel volume materials include glass, ceramics, titanium, tungsten, or other common structural insulators, and the like. Preferably, the inserts used for the seats on the fins comprise silicone rubber, Teflon or one of the insulator type materials mentioned above. Thermally insulating material having a low coefficient of friction such as Teflon are preferred for the bushings supporting the tension shaft. Preferably, the insulating pads and bushings are unfilled.

The mandrel may be supported at its upper end by any suitable conveyor means. The conveyor means can comprise means to grip the upper end of the mandrel, such as a collar or chuck. The tension applying means may be manually activated or inactivated by an operator or automatically by any suitable and conventional electric or fluid supply means controlled by switches or valves. The mandrels may be raised and lowered manually or by any suitable and conventional reciprocatable means such as a ball and screw, two way acting air piston, hydraulically actuated pistons, chain & gear systems, screw & block systems, cams, ramps, cranes, and the like. The mandrel and/or the entire conveyor means may be raised and lowered by any suitable and conventional means such as an elevator means.

Generally, the cylinders are immersed into a liquid coating mixture until only a small uncoated band around the uppermost end of the cylinder remains above the level of the liquid coating material bath. This prevents deposition of coating on the small band. This uncoated band may be utilized for electrically grounding the cylinder during electrophotographic imaging, if the cylinder is electrically conductive. The uncoated band can also be used to support spacers which ride on the uncoated area to space other subsystems out of contact with the coated drum. Also, total immersion of the cylinder in the coating mixture is undesirable because the coating mixture can overflow the top edge of the cylindrical cylinder and form unwanted deposits on the mandrel, disk and interior of the cylinder. Although dip coating may be effected by moving the drum vertically downward into a coating liquid bath, dip coating may also be accomplished by moving the coating liquid bath, upwardly or by a combination of these movements. For purposes of convenience, all these movements are considered as encompassed by the expression "immersing". Means for lowering and raising the mandrel are well known among those skilled in the art and the detailed description thereof is omitted herein.

The temperatures utilized for drying the coating on a photoreceptor depends upon the speed of the coated hollow cylinder through a coating zone and the material used in the coating. Thus, for example, when a highly volatile solvent is used to apply the coating, it is normally volatile at relatively low temperatures. Therefore, the maximum continuous use temperature rating for the material employed in the mandrel arm can be relatively low. Since the ASTM maximum continuous use temperature rating for a given material relates to exposure to a given temperature for an extended period of time, a material having a specified ASTM maximum continuous temperature can actually be utilized for transporting a coated hollow cylinder through a drying zone maintained at a drying temperature which exceeds the ASTM maximum continuous use temperature of the mandrel material because the residence time in the drying zone is relatively short. For example, a mandrel body made from material having a ASTM maximum continuous use temperature of about 170° C. may be safely utilized to transport the coated hollow cylinder through an oven maintained at a temperature of about 185° C. when the residence time of the mandrel and coated cylinder through the oven is about 1 hour or less. Generally, for most coating drying conditions the ASTM maximum continuous use temperature should be about 5° C. greater than the maximum drying temperature or higher.

As indicated above, the maximum continuous use temperature utilized depends upon the time zone temperature, and the residence time in the drying zone. For example, in a typical drying pass, the oven is maintained at a temperature of about 105° C. and the residence time of the mandrel in the drying zone is about 10 minutes, satisfactory results may be achieved with the mandrel body having an ASTM maximum continuous use temperature of at least about 100° C. Preferably, maximum continuous use temperature, in this example, is at least about 95° C. Optimum results are achieved with a maximum continuous use temperature greater than about 105° C. When the maximum continuous use temperature of a mandrel body in this specific example is less than about 80° C., the mandrel can decompose and distort.

There are various cylindrical electrostatographic imaging member embodiments. Typically, a hollow cylindrical substrate is provided having an electrically conductive surface. For electrophotographic imaging members, at least one photoconductive layer is then applied to the electrically conductive surface. An optional charge blocking layer may be applied to the electrically conductive layer prior to the application of the photoconductive layer. If desired, an adhesive layer may be utilized between the charge blocking layer or conductive layer and the photoconductive layer. For multilayered photoreceptors, an electrophotographic imaging layer comprising a charge generation layer and a charge transport layer is usually applied onto the underling surface. For ionographic imaging members, an electrically insulating dielectric layer is applied to the electrically conductive surface.

The cylindrical substrate, i.e. hollow cylinder is usually opaque but can be substantially transparent. The hollow cylinder may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are molded or extruded into hollow cylinders. The electrically insulating or conductive substrate is relatively rigid.

The thickness of the cylindrical substrate depends on numerous factors, including rigidity and economical considerations, and thus may be of substantial thickness, for example, about 4 millimeters, or of a minimum thickness of about 50 micrometers, provided there are no adverse effects on the final electrostatographic device. The surface of the substrate layer is preferably cleaned prior to coating to promote greater adhesion of the deposited coating. Cleaning may be effected, for example, by exposing the surface of the substrate layer to plasma discharge, ion bombardment and the like.

If the bulk of the cylindrical substrate is electrically insulating it is provided with an electrically conductive surface layer. The conductive layer may vary in thickness over substantially wide ranges depending on the optical transparency desired for the electrostatographic member. The conductive layer may be an electrically conductive metal layer formed, for example, on the substrate by any suitable coating technique, such as a vacuum depositing technique. A typical electrical conductivity for conductive layers for electrophotographic imaging members in slow speed copiers is about $10^2$ to $10^3$ ohms/square. Generally, the entire hollow cylindrical substrate comprises a single metal such as aluminum, nickel, common alloys of aluminum, rigid plastics, and the like.

An optional charge blocking and/or adhesive layers may be applied to the electrically conductive surface of a hollow cylinder for photoreceptors. Charge blocking and adhesive charge layers are well known in the art and usually comprise a film forming component and a solvent. Any suitable charge blocking and/or adhesive layer well known in the art may be utilized. Typical charge blocking and/or adhesive layer materials include, for example, nylon, polyesters, polyurethanes, and the like. For convenience in obtaining thin layers, the blocking and/or adhesive layers are preferably applied by immersion of the cylinder in a dilute solution bath, with the solvent being removed after deposition of the coating by conventional drying techniques such as forced air heating, infrared radiation heating, and the like. The blocking layer should be continuous and have a uniform thickness.

Any suitable photogenerating layer may be applied to the blocking and/or adhesive blocking layer. The photogenerating layer is then overcoated with a contiguous hole transport layer as described hereinafter. Examples of typical photogenerating layers include inorganic or organic photoconductive particles dispersed in a solvent solution of a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidene-chloridevinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved. Drying of the immersion deposited coating to remove solvent may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture may comprise any suitable charge transporting molecule dissolved or molecularly dispersed in a solvent solution of a film forming binder. Any suitable resin binder dissolved in a solvent may be employed in the process of this invention. Typical inactive resin binders soluble in methylene chloride include polycarbonate resin, polyvinylcarbazole, polyester, polyarylate, polyacrylate, polyether, polysulfone, and the like. Molecular weights can vary, for example, from about 20,000 to about 150,000.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Drying of the deposited coating to remove solvent may be effected by any suitable conventional technique such as oven drying, infra red radiation drying, vacuum drying, ambient air flow drying, compressed air drying, and the like.

Optionally, an overcoat layer may also be utilized to improve resistance to abrasion. Overcoatings are continuous and generally have a thickness of less than about 10 micrometers.

For electrographic imaging members, a dielectric layer overlying the conductive layer may be substituted for the photoconductive layers. Any suitable, conventional, flexible, electrically insulating dielectric film forming polymer may be used in the dielectric layer of the electrographic imaging member. The polymer is dissolved in a solvent when applied by immersion coating. Drying of the deposited coating to remove solvent may be effected by any suitable conventional technique such as oven drying, infra red radiation drying, vacuum drying, ambient air flow drying, compressed air drying, and the like.

The mandrel of this invention withstands the temperature excursions, chemicals, and chemical fumes associated with the immersion coating and processing of hollow cylinders.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An aluminum drum having an inside diameter of about 3.9 cm, a wall thickness of 0.005 cm and a length of about 30 cm was mounted onto a mandrel. The mandrel comprised an elongated, generally cylindrically shaped aluminum arm having a length of about 13 cm and an average diameter less than about 0.5 cm. The arm contained a hole extending axially through the arm from one end of the arm to the other. An expandable circular disk shaped member having a flat top and flat bottom, a circular edge with a donut shaped profile and a diameter of 2.9 cm was provided with a hole extending axially through the center of the disk. This hole had a diameter of 3.6 mm. This disk was made from opaque white silicone polymer. The polymer had a durometer of about 25 and a maximum continuous use temperature rating of about 150° C. The disk was mounted onto one end of the arm by means of a tension shaft. The tension shaft had a diameter of 10 millimeters and a length of 20 cm and had a flat, disk shaped presser means welded to one of the shaft. The free end of the shaft was threaded through the hole in the expandable circular disk and through the hole extending through the elongated aluminum arm. The free end of the shaft extended about 5 cm beyond the end of the elongated aluminum arm. The free end of the shaft was threaded and was fitted with a washer and nut. The nut was tightened at room temperature until a pull off pressure of about 35 pounds was required to slide the drum off of the mandrel. The drum was then carried by the mandrel was vertically (attitude of drum axis) immersed into a coating bath of a solution of a 10 percent by weight base layer polymer dissolved in n-butyl alcohol-solvent at a temperature of 18° C. After vertically removing the coated drum from the coating bath, the drum, still carried by the mandrel, was heated in a forced air oven at a temperature of about 155° C. for about 30 minutes. After drying and cooling to ambient temperature, the dried coated drum was tested for for coating uniformity and electrostatic properties. It was found that the donut shaped disk had severly deformed under temperature and pressure. It would not readily return to its original shape nor would it release from the aluminum drum. The face temperature measurements of the drum during the oven heating cycle indicated that the silicone behaved as as a considerable heat sink, thereby lowering the drum face temperature and lengthening the required oven heating cycle. This also quite unavoidably caused the formation of a non-uniform coating. As such, the coated drum proved to be quite unuseable since the drum had to be forceably removed. No such assistance can be readily provided or tolerated in a continuous production mode. Each of these several failure modes are unacceptable.

EXAMPLE II

The procedures described in Example I were repeated, except that the expandable circular disk shaped member was replaced with a disk shaped member having a flat top and flat bottom, a circular edge with a wedge shaped profile and a diameter of 39 mm was provided with a hole extending axially through the center of the disk. This hole had a diameter of 11 mm. This disk was made from white opaque silicone polymer. The polymer had a durometer of about 25 and a maximum continuous use temperature rating of about 150° C. After coating, drying and cooling, the dried coated drum was tested for coating uniformity and electrostatic properties. It was found that this disc shape would be acceptable for performing at room temperature. In fact it would make a very practical handling and transport device for the tube, both prior to and after the coating process. However, the disk permanently deformed at the elevated temperature and pressure. It also tended to adhere to the drum after coating due to the effects of the drying temperature, pressure and solvent exposure. Due to these results the design was unacceptable. Additionally, it was found that the disk behaved as a significant heat sink, which affected the coating uniformity.

EXAMPLE III

The procedures described in Example I were repeated, except that the expandable circular disk shaped member was replaced with a disk shaped member having a flat top and flat bottom, a circular edge with a wedge shaped profile and a diameter of 36 mm. was provided with a hole extending axially through the center of the disk. This hole had a diameter of 21 mm. This disk was made from medium blue silicone polymer and a maximum continuous use temperature rating of about 230° C. After coating, drying and cooling, the dried coated drum was tested for coating uniformity and electrostatic properties. It was found that, this disk shape, was also totally acceptable in all regards. The retentive strength or "pull-off force" remained constant at all test modes and temperatures. The shape did not distort at 'cool-down', nor did it display any memory effects. It had no tendency to stick to the inside of the tubes' contacting surface. There was no degradation to the polymer due to solvent exposure. The disc in discussion, as evidenced by substrate surface temperature data logging, showed no appreciable heat-sink properties. Accordingly, this polymer was replicated in the designated profiles as illustrated. In each case the same or similar results were obtained.

EXAMPLE IV

The procedures described in Example I were repeated, except that the expandable circular disk shaped member was replaced with a disk shaped member having a flat top and flat bottom, a circular edge with a wedge shaped profile and a diameter of 36 mm. was provided with a hole extending axially through the center of the disk. This hole had a diameter of 21 mm. This disk was made from medium blue silicone polymer and a maximum continuous use temperature rating of about 230° C. Additionally, this experiment was repeated with two mandrels, with all conditions virtually the same, except that one mandrel had its bottom substrate contacting end surface relieved in four places to form the fin support features as shown in FIG. 3. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C. for the finned mandrel. This translated to an improved heat-up and cool down cycle for the substrate which is directly related to an improved coating and subsequently improved electrostatic properties of the photoreceptor.

EXAMPLE V

The procedures described in Example I were repeated, except that the expandable circular disk shaped member was replaced with a disk shaped member having a flat top and flat bottom, a circular edge with a wedge shaped profile and a diameter of 36 mm. was provided with a hole extending axially through the center of the disk. This hole had a diameter of 21 mm. This disk was made from medium blue silicone polymer and had a maximum continuous use temperature rating of about 230° C. Additionally, this experiment was repeated with two mandrels, with all conditions virtually the same, except that one mandrel had its bottom substrate contacting end surface relieved in eight places by drilling 11 mm. holes parallel to the central axis with their centers located 15 mm from the center of the mandrel. The second mandrel was the four finned bottom as detailed in FIG. 3. The drilled configuration again was another attempt to provide for air circulation to the uppermost portion of the substrate for both heating and cooling uniformity. These holes provided approximately 25% open area at the top of the tube above the contacting point. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C., for the finned mandrel. This translated to an improved heat-up and cool down cycle for the substrate which is directly related to an improved coating and subsequently improved electrostatic properties of the photoreceptor.

The drilled design also had serious cracking located in radial directions associated with the drilled holes which further delineates the design considerations.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A mandrel for transporting hollow electrostatographic drums comprising an elongated arm having a first end and a second end, an expandable disk shaped member supported at said first end and means supported at said second end to expand said expandable disk, said mandrel arm comprising an elongated body having an imaginary axis and at least three fins extending substantially radially from said body, each of said fins having an alignment shoulder adjacent said first end adapted to receive an end of a hollow cylinder and to coaxially align said cylinder with said elongated arm, said elongated body and said fins occupying less than about 25 percent of the internal cross-sectional area of said cylinder and at least.

2. A mandrel according to claim 1 wherein said mandrel arm comprising said elongated body has four fins extending substantially radially from said body.

3. A mandrel according to claim 2 wherein a cross section of said elongated body and said fins occupies less than about 50 percent of the internal cross-sectional area of said cylinder.

4. A mandrel according to claim 2 wherein said alignment shoulder of each of said fins comprises a thermally insulating material.

5. A mandrel according to claim 2 wherein each of said fins is chamfered adjacent to said alignment shoulder for guiding said cylinder to said shoulder.

6. A mandrel according to claim 2 wherein said mandrel comprises said elongated arm and a reciprocatable tension shaft extending coaxially through said arm.

7. A mandrel according to claim 6 comprising thermally insulating material interposed between said elongated arm and said reciprocatable tension shaft.

8. A mandrel according to claim 6 wherein said tension shaft has ends having a greater cross sectional area than the central portion of said shaft.

9. A mandrel according to claim 2 wherein said mandrel arm comprises a thermally insulating insulating material.

10. A mandrel according to claim 9 wherein said thermally insulating material comprises a polymer has an maximum continuous use temperature rating of at least about 230° C.

11. A mandrel according to claim 9 wherein said thermally insulating material comprises a polymer and between about 35 percent and about 45 percent by weight filler based on the total weight of said thermally insulating material.

12. A mandrel according to claim 11 wherein said filler comprises glass fibers.

13. A mandrel according to claim 9 wherein said thermally insulating material has a thermal conductivity of less than about 1 watt/mK.

* * * * *